United States Patent
Kasuya et al.

(10) Patent No.: US 8,494,219 B2
(45) Date of Patent: Jul. 23, 2013

(54) IMAGE EXTRACTION DEVICE AND IMAGE EXTRACTION METHOD

(75) Inventors: Yuuji Kasuya, Yokohama (JP); Tadashi Araki, Kawasaki (JP); Keiji Ohmura, Yokohama (JP); Yusuke Shibata, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 477 days.

(21) Appl. No.: 12/797,983

(22) Filed: Jun. 10, 2010

(65) Prior Publication Data

US 2010/0322519 A1 Dec. 23, 2010

(30) Foreign Application Priority Data

Jun. 23, 2009 (JP) .................................. 2009-148279

(51) Int. Cl.
*G06K 9/00* (2006.01)
*G06K 9/36* (2006.01)
*G03G 15/00* (2006.01)

(52) U.S. Cl.
USPC ............................. 382/103; 382/291; 399/42

(58) Field of Classification Search
None
See application file for complete search history.

(56) References Cited

U.S. PATENT DOCUMENTS

| | | | | |
|---|---|---|---|---|
| 6,031,634 A | * | 2/2000 | Shimada et al. | 358/426.12 |
| 6,144,403 A | * | 11/2000 | Otani | 348/14.12 |
| 2001/0022675 A1 | * | 9/2001 | Kelly et al. | 358/488 |
| 2005/0078879 A1 | * | 4/2005 | Sakurai et al. | 382/275 |
| 2006/0109520 A1 | * | 5/2006 | Gossaye et al. | 358/449 |
| 2009/0296167 A1 | * | 12/2009 | Motoyama | 358/474 |

FOREIGN PATENT DOCUMENTS

| | | |
|---|---|---|
| JP | 2005-167479 | 6/2005 |
| JP | 2005-260691 | 9/2005 |

* cited by examiner

*Primary Examiner* — Bhavesh Mehta
*Assistant Examiner* — David F Dunphy
(74) *Attorney, Agent, or Firm* — Oblon, Spivak, McClelland, Maier & Neustadt, L.L.P.

(57) ABSTRACT

An image extraction device for extracting an image showing a document from an image of the document shot by an imaging device includes a document table on which a document is placed, a side detection unit, an opposing side estimator, and an image extraction unit. The side detection unit detects a side of the document on the document table based on the shot image of the document. The opposing side estimator estimates a position of a side opposite the side detected by the side detection unit. The image extraction unit segments the image of the document from the shot image of the document based on the side detected by the side detection unit and the opposite side estimated by the opposing side estimator.

19 Claims, 7 Drawing Sheets

IMAGE EXTRACTION DEVICE AND IMAGE EXTRACTION METHOD

CROSS-REFERENCE TO RELATED APPLICATIONS

This patent application is based on and claims priority pursuant to 35 U.S.C. §119 from Japanese Patent Application No. 2009-148279, filed on Jun. 23, 2009 in the Japan Patent Office, which is hereby incorporated herein by reference in its entirety.

BACKGROUND OF THE INVENTION

1. Field of the Invention

Exemplary aspects of the present invention generally relate to an image extraction device, and more particularly, to an image extraction device that extracts an image of a document from a shot image shot by an imaging device.

2. Description of the Background Art

Conventionally, in a meeting or the like, a document camera or an overhead camera (hereinafter referred to as a document camera) is used to project an image of a document placed on a document table of the document camera onto a projection screen or a monitor. In order to show the document image on the projection screen or the monitor, an image extraction device is employed to segment the document image from a shot image shot by an imaging device of the document camera. Such an image extraction device allows participants in the meeting to share the same document as well as any handwritten information added to the document during the meeting with ease.

One example of such a known image extraction device detects the contours of the document table using as a reference from a shot image of the document table taken when no document was placed thereon. The contours of the document table are then registered. Subsequently, the document camera masks the registered contours of the document table to acquire the contours of the document placed thereon.

Although advantageous, there is a drawback to this approach in that, since the image of the document is extracted by detecting the contours of the entire document placed on the document table, the entire document needs to be properly placed on the document table. Otherwise, the image showing the entire document cannot be extracted properly.

In view of the above, a device capable of extracting an image showing the entire document is required even when only a portion of the document is placed on the document table of the document camera.

SUMMARY OF THE INVENTION

In view of the foregoing, one illustrative embodiment of the present invention provides an image extraction device to extract an image showing a document from an image of the document shot by an imaging device. The image extraction device includes a document table, a side detection unit, an opposing side estimator, and an image extraction unit. The document table accommodates a document thereon. The side detection unit detects a side of the document on the document table based on the shot image of the document. The opposing side estimator estimates a position of a side opposite the side detected by the side detection unit. The image extraction unit extracts the image of the document from the shot image of the document based on the side detected by the side detection unit and the opposite side estimated by the opposing side estimator.

According to another preferred embodiment, an image extraction device includes a document table, a side detection unit, an opposing side estimator, an image extraction unit, an original image storage unit, and an image composition unit. The document table accommodates a document thereon. The side detection unit detects a side of the document on the document table based on the shot image of the document. The opposing side estimator estimates a position of a side of the document opposite the side detected by the side detection unit. The image extraction unit extracts the document image from the shot image based on the side detected by the side detection unit and its opposite side estimated by the opposing side estimator. The original image storage unit stores a document image as an original image when a plurality of the document images show the same content. The image composition unit forms a single document image by combining the original image with one or more difference images showing differences between the plurality of document images and the original image after a change is made to the plurality of document images.

According to still another preferred embodiment, an image extraction method for extracting an image showing a document on a document table from an image of the document shot by an imaging device includes steps of detecting a side of the document on the document table based on the shot image of the document, estimating a position of a side opposite the side detected by the detecting, and extracting the document image from the shot image of the document based on the side detected by the detecting and the opposite side estimated by the estimating.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

Figure 1:
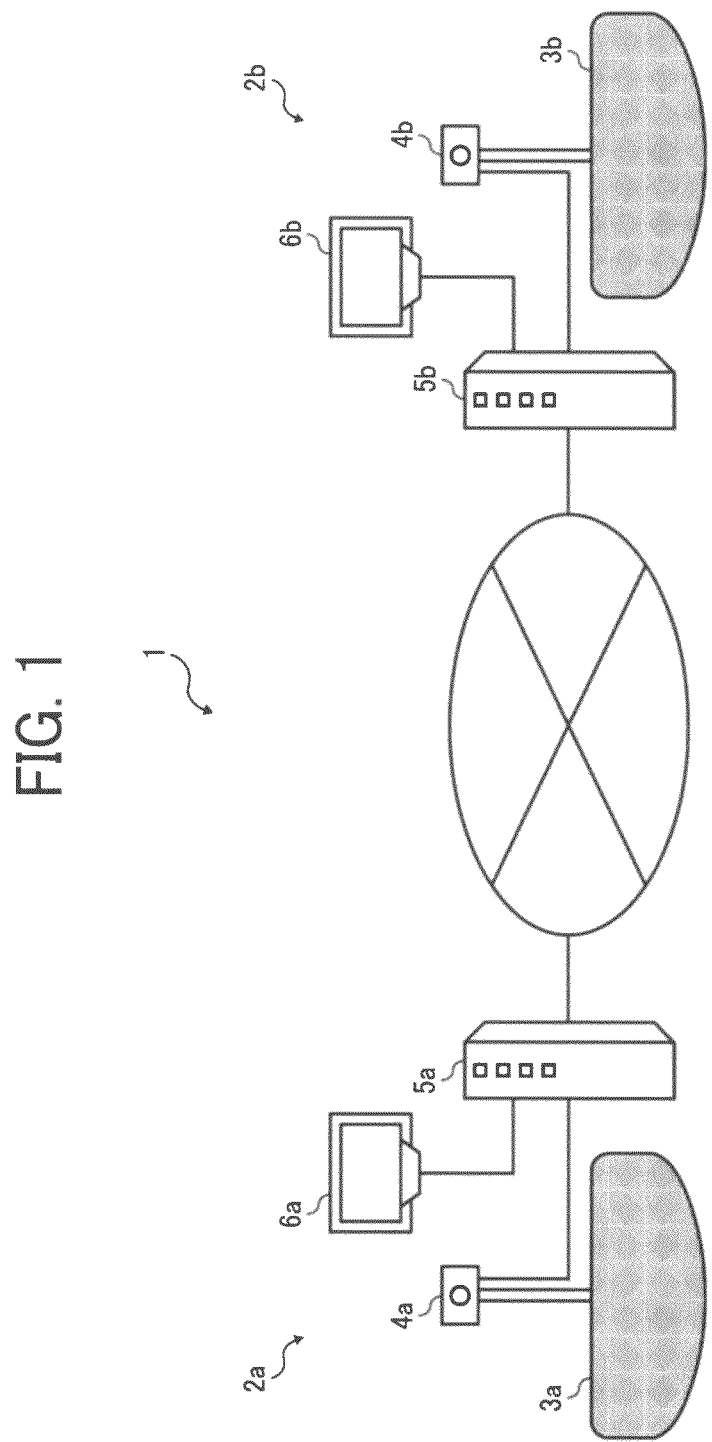
FIG. 1 is a schematic diagram illustrating a shared document camera system according to an illustrative embodiment of the present invention.

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, and initially to FIG. 1, one example of a shared document camera system according to an illustrative embodiment of the present invention is described.

FIG. 1 is a block diagram illustrating a shared document camera system 1. The shared document camera 1 includes a plurality of image extraction devices according to the illustrative embodiment of the present invention.

As illustrated in FIG. 1, the shared document camera system 1 includes image extraction systems 2a and 2b, each provided at a plurality of locations such as meeting rooms.

The image extraction systems 2a and 2b are hereinafter also collectively referred to as an image extraction system 2 where differentiation is not necessary.

The image extraction systems 2a and 2b include document tables 3a and 3b (herein also collectively referred to as document table 3), imaging apparatuses 4a and 4b (herein also collectively referred to as imaging apparatus 4), image extraction devices 5a and 5b (herein also collectively referred to as image extraction device 5), and display devices 6a and 6b (herein also collectively referred to as display device 6), respectively. The image extraction devices 5a and 5b are connected to each other via a network, for example, the internet. The display device 6 includes, but is not limited to, a liquid crystal display, a projector, or the like.

In FIG. 1, two image segmentation systems 2a and 2b are illustrated. However, the number of the image segmentation systems employed in the shared document camera system 1 is not limited to two.

The document table 3 is a table on which a document can be placed. The document table 3 may be formed of, for example, a board, cloth, paper, or any other suitable material. The size of a surface of the document table 3 on which the document is placed is large enough to accommodate a plurality of documents assumed to be placed in an unstacked manner. The document table 3 does not have to accommodate an entire document, and thus the size of the document table 3 can be substantially smaller than the size of the document.

Figure 2:
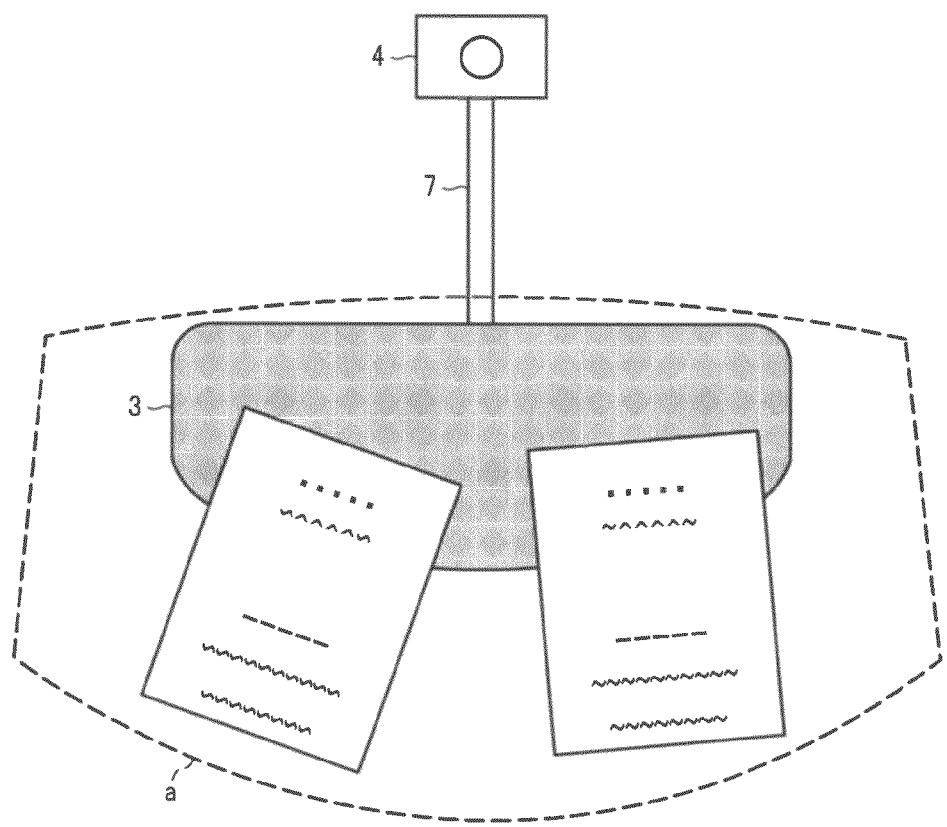
FIG. 2 is a schematic diagram illustrating a document table on which one side of a document is placed according to an illustrative embodiment of the present invention.

FIG. 2 is a schematic diagram illustrating the document table 3 on which the document is placed. According to the illustrative embodiment, as illustrated in FIG. 2, the document table is wide enough to accommodate two documents placed next to each other in an unstacked manner but not very deep, with the length of the document table 3 in the vertical direction being substantially shorter than the length of a typical document. The document table 3 is itself placed on a table or a desk, not illustrated.

The surface of the document table 3 is colored, so that the edges of the document placed on the document table 3 can be distinguished from the document table 3 itself. In other words, the boundary between an image representing the document and an image representing the surface of the document table 3 can be detected when the document table 3 on which the document is placed is shot by the imaging device.

For example, with a known detection technique using the luminance of each pixel to detect the boundary, if the color of a document is assumed to be white, a preferred color of the surface of the document table 3 is black. Here, the surface of the document table 3 has only one color. Alternatively, as long as the document can be distinguished from the surface of the document table, the surface of the document table may have a plurality of colors, patterns with different colors, or any other suitable design.

As illustrated in FIG. 2, the imaging device 4 is attached to a pole 7 such that the imaging device 4 has a shooting area "a" indicated by broken lines that includes the document table 3 and the entire document on the document table 3. Alternatively, instead of being mounted on the pole 7, the imaging device 4 may be hung from above.

The imaging device 4 according to the illustrative embodiment may be a generally-known video camera. The image shot by the imaging device 4 is converted to an electric signal which is then output to the image extraction device 5, which is connected externally.

Figure 3:
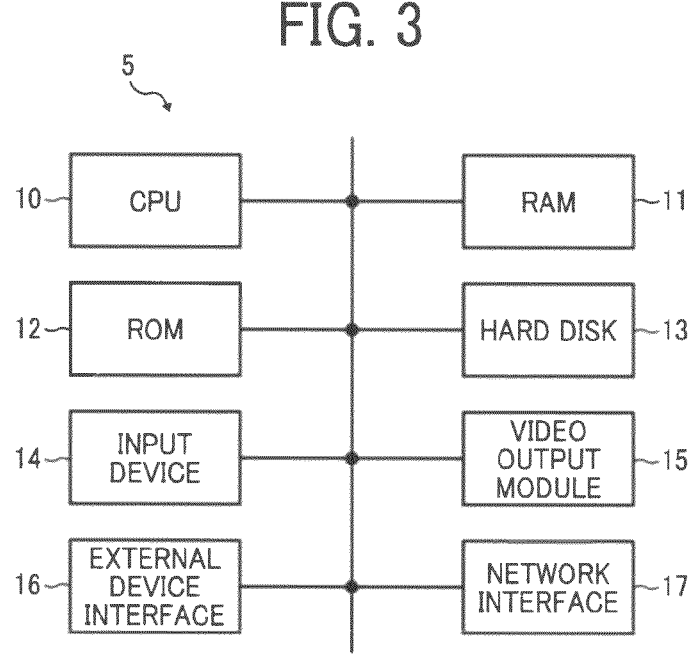
FIG. 3 is a block diagram illustrating a configuration of hardware of an image extraction device according to an illustrative embodiment of the present invention.

With reference to FIG. 3, a description is now provided of the image extraction device 5 according to the illustrative embodiment. FIG. 3 is a block diagram illustrating a hardware configuration of the image extraction device 5.

The image extraction device 5 includes a Central Processing Unit (CPU) 10, a Random Access Memory (RAM) 11, a Read Only Memory (ROM) 12, a hard disk 13, an input device 14, a video output module 15, an external device interface 16, and a network interface 17.

Various programs to implement functions of the image extraction device 5 are stored in the ROM 12 and the hard disk 13. When the CPU 10 executes the programs stored in the ROM 12 and the hard disk 13 using the RAM 11 as a workplace, the functions of the image extraction device 5 are implemented.

The input device 14 includes a keyboard, a mouse, and so forth, and receives from a user an instruction for the image extraction device 5.

The video output module 15 outputs an image of the document extracted by the image extraction device 5 as an image signal to the display device 6.

The external device interface 16 enables exchanges of data with external devices, thereby enabling the image shot by the imaging device 4 to be output to the external devices.

The network interface 17 enables communication with other image extraction devices 5 through the network to transmit and receive data therebetween.

Figure 4:
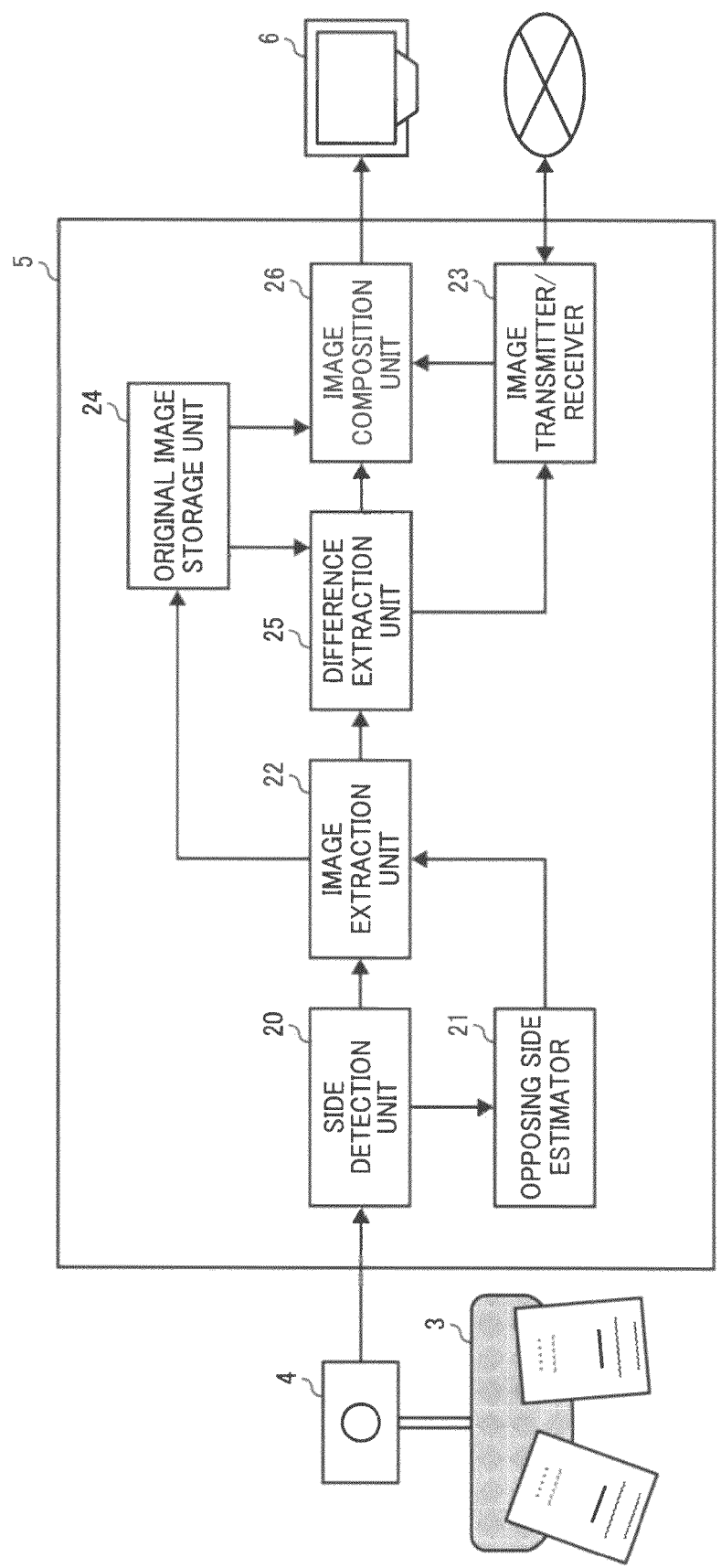
FIG. 4 is a functional block diagram illustrating functions of the image extraction device of FIG. 3 according to an illustrative embodiment of the present invention.

Referring now to FIG. 4, there is provided a functional block diagram illustrating the image extraction device 5. As illustrated in FIG. 4, the image extraction device 5 includes a side detection unit 20, an opposing side estimator 21, an image extraction unit 22, an image transmitter/receiver 23, an original image storage unit 24, a difference extraction unit 25, and an image composition unit 26.

Based on the image shot by the imaging device 4, the side detection unit 20 detects one side of the document placed on the document table 3. The opposing side estimator 21 estimates a position of a side opposite the side detected by the side detection unit 20. The image extraction unit 22 extracts the document image from the shot image based on the position of the detected side and the position of the opposing side estimated by the opposing side estimator 21. The image transmitter/receiver 23 transmits and receives data between the image extraction devices 5. The original image storage unit 24 stores a document image as an original image when a plurality of the document images shows the same content. The difference extraction unit 25 extracts a difference image obtained by extraction of the document image from the original image after a change is made to the document. The image composition unit 26 generates a single document image by combining the difference image with the original image.

Functions of the side detection unit 20, the opposing side estimator 21, the image extraction unit 22, the difference extraction unit 25, and the image composition unit 26 are implemented by the CPU 10. Functions of the image transmitter/receiver 23 are implemented by the CPU 10 and the network interface 17. Functions of the original image storage unit 24 are implemented by the CPU 10 and the hard disk 13.

Figure 5:
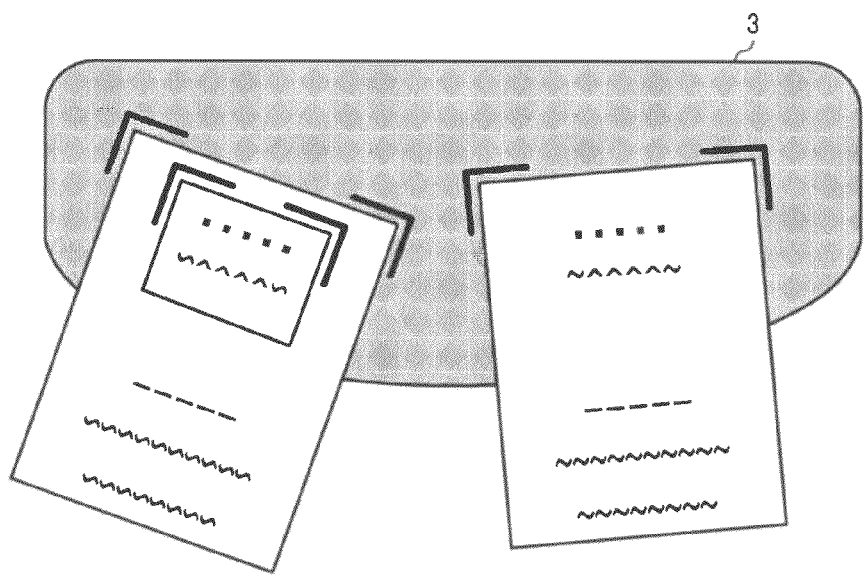
FIG. 5 is a schematic diagram for explaining detection of a corner of the document according to an illustrative embodiment of the present invention.

With reference to FIG. 5, a description is now provided of detection of one side of a document according to the illustrative embodiment. FIG. 5 is a schematic diagram for explaining detection of corners of the document.

The side detection unit 20 detects one side of the document by using a known corner detection method based on the luminance of each pixel of an image. In FIG. 5, based on the luminance, the side detection unit 20 detects corners of the document from a single frame of a shot image of the document shot by the imaging device 4. Based on the detected corners, one side of the document placed on the document table is detected from the contour of the document. It is to be noted that the corners of the document to be detected are the corners having information indicating a convex direction.

As will be described in detail, even when the document on the document table 3 has a folded corner because the document is bound by a staple or the like, the side detection unit 20 can still detect one side of the document based on the shot image of the document.

Figure 6:
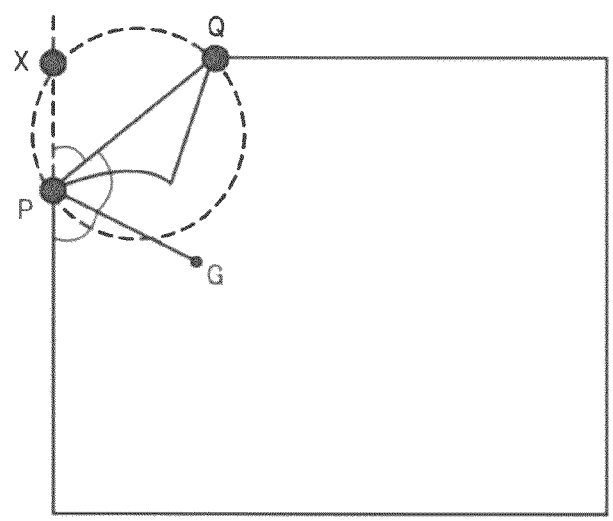
FIG. 6 is a schematic diagram for explaining an example of a method of detecting a side of the document having a folded corner according to an illustrative embodiment of the present invention.

Referring now to FIG. 6, there is provided a schematic diagram for explaining an example of a detection method of the side of the document having a folded corner. In FIG. 6, reference letters P and Q indicate corners of the folded portion of the document. Reference letter X indicates the original position of the corner prior to folding. The side detection unit 20 extracts the corners P and Q from the detected corner based on the luminance of the pixels, and estimates the position of the corner X based on the extracted corners P and Q.

In particular, when each of two corners among the detected corners based on the luminance of the pixels has an angle greater than 90 degrees and equal to or less than 180 degrees, the sum of the angles is 270 degrees, and the distance between two corners is shorter than a predetermined distance, the side detection unit 20 extracts the corners as the corners formed by folding the corner of the document.

Therefore, the corner X before the document is folded is on a circle having a diameter which is a line connecting the corner P and the corner Q. The side detection unit 20 estimates the corner X such that the line PQ is rotated about the corner P by an angle XPQ, and the point of intersection between the rotated line PQ and the circle is estimated as the location of the original corner X.

In FIG. 6, the angle XPQ is obtained by an equation 180−2×Angle GPQ, where G is a center of mass of a circular sector formed with pixels representing the document included in a circle having an arbitrary radius with the corner P at the center. Alternatively, the original corner before the document is folded can be estimated such that the line PQ is rotated about the corner Q by the angle XQP, and an intersecting point of the rotated line and the circle having the diameter of the line PQ is obtained as a corner X2. The midpoint of the corner X and the corner X2 is estimated as the corner before the document is folded.

Based on the estimated corner before the corner is folded and the corner having an angle of 90 degrees detected based on the luminance, the side detection unit 20 pairs the estimated corner and the corner having a 90-degree angle, and extracts such a pair of corners as the corners of both ends of one side of the document. It is to be noted that the pair of corners means that one of two rays forming a corner overlaps one of the rays forming the other corner.

In particular, in order to pair the opposing corners, the center of mass of the circular sector formed with the pixels representing the document included in a circle having an arbitrary radius with the corner as a center of the circle is calculated in the convex direction. Then, the corners that form an isosceles triangle together with an intersecting point of straight lines each of which passes through the respective corner and the center of mass of the circular sector are paired.

Furthermore, the side detection unit 20 references information on sheet sizes stored in the hard disk 13 to find a size that corresponds to the distance between the paired corners in the horizontal direction, thereby detecting the side of the document.

The hard disk 13 stores, in advance, information on different sizes of sheets that are likely to be used. The information includes, for example, sheet lengths and widths. According to the illustrative embodiment, the hard disk 13 stores information on lengths and widths of five different sheets, A3-Landscape, A4-Landscape, A4-Portrait, B5-Landscape, and B5-Portrait. It is to be noted that the information on the sheet sizes to be stored in the hard disk 13 includes widths of unique values.

When detecting one side of the document, the side detection unit 20 performs a keystone correction operation before detection of the side of the document if there is a keystone distortion on the image shot by the imaging device 4. If there is a distortion on the image due to a fish-eye lens or the like, a distortion correction is performed in accordance with an area showing the document table 3 before detection of the side of the document.

Based on the position of one side detected by the side detection unit 20, the opposing side estimator 21 estimates the position of a side opposite the detected side detected by the side detection unit 20. The opposing side estimator 21 obtains from the hard disk 13 the vertical length of the sheet having the horizontal width corresponding to the length of the side of the document detected by the side detection unit 20, thereby estimating the position of the side opposite the detected side.

For example, the opposing side estimator 21 estimates the position of the opposite side to be at a position distant from the imaging device 4 in a direction perpendicular to both ends of the side detected by the side detection unit 20 by an amount equal to the vertical length of the sheet.

The image extraction unit 22 extracts the document image based on the side of the document detected by the side detection unit 20 and its opposite side estimated by the opposite side estimator 21. The image extraction unit 22 extracts, from one frame of the shot image, a sheet area that is demarcated by the side detected by the side detection unit 20 and its opposite side estimated by the opposite side estimator 21 as an image representing the document.

The image extraction unit 22 determines whether or not the sheet area demarcated by the side detected by the side detection unit 20 and the opposite side estimated by the opposing side estimator 21 is included in another sheet area demarcated by another detected side and another estimated opposite side within the same frame. If the sheet area is not included in the same frame, the sheet area is extracted as a document image.

When the side detection unit 20 detects one side and the distortion correction is performed in accordance with the area showing the document table 3, the document image is extracted after the distortion correction is performed in accordance with the sheet area.

The document image extracted by the image extraction unit 22 and a difference image between the document image and an original image are sent and received between the image transmitter/receiver 23 and other image extraction devices 5 through the network interface 17.

When a plurality of document images extracted by the image extraction unit 22 shows the same content and/or the document image extracted by the image extraction unit 22 and the document image received by the image transmitter/receiver 23 show the same content, the original image storage unit 24 stores the document image in the hard disk 13 as an original image.

The difference extraction unit 25 extracts the difference image between the document image extracted by the image extraction unit 22 and the original document.

Alternatively, the difference extraction unit 25 may extract the difference image per unit pixel, or the difference image per unit of a smallest rectangle that includes a connected component of black pixels.

When there is a change in the document images showing the same content, the image composition unit 26 generates a single document image by combining the original image with the difference images between the original image and the document images after the change is made from the original image. When the plurality of the document images extracted by the image extraction unit 22 shows the same content, the image composition unit 26 combines the original image with the difference image between the document images after change and the original image.

When the extracted document image extracted by the image extraction unit 22 and the document image received by the image transmitter/receiver 23 show the same content, the image composition unit 26 combines the difference image between the document image extracted by the image extraction unit 22 after change and the original image, and the difference image between the document image received by the image transmitter/receiver 23 after change and the original image with the original image.

When the plurality of document images extracted by the image extraction unit 22 shows the same content, the image composition unit 26 may generate one difference image to be sent by the image transmitter/receiver 23 by combining the difference images between the document images after change and the original image.

Based on the plurality of document images after changes, the image composition unit 26 aligns the position of the image when combining the difference images. For example, the image composition unit 26 aligns the image by superimposing the plurality of document images after changes on one another and obtains a position at which the superimposed pixel values show the most overlap.

Figure 7:
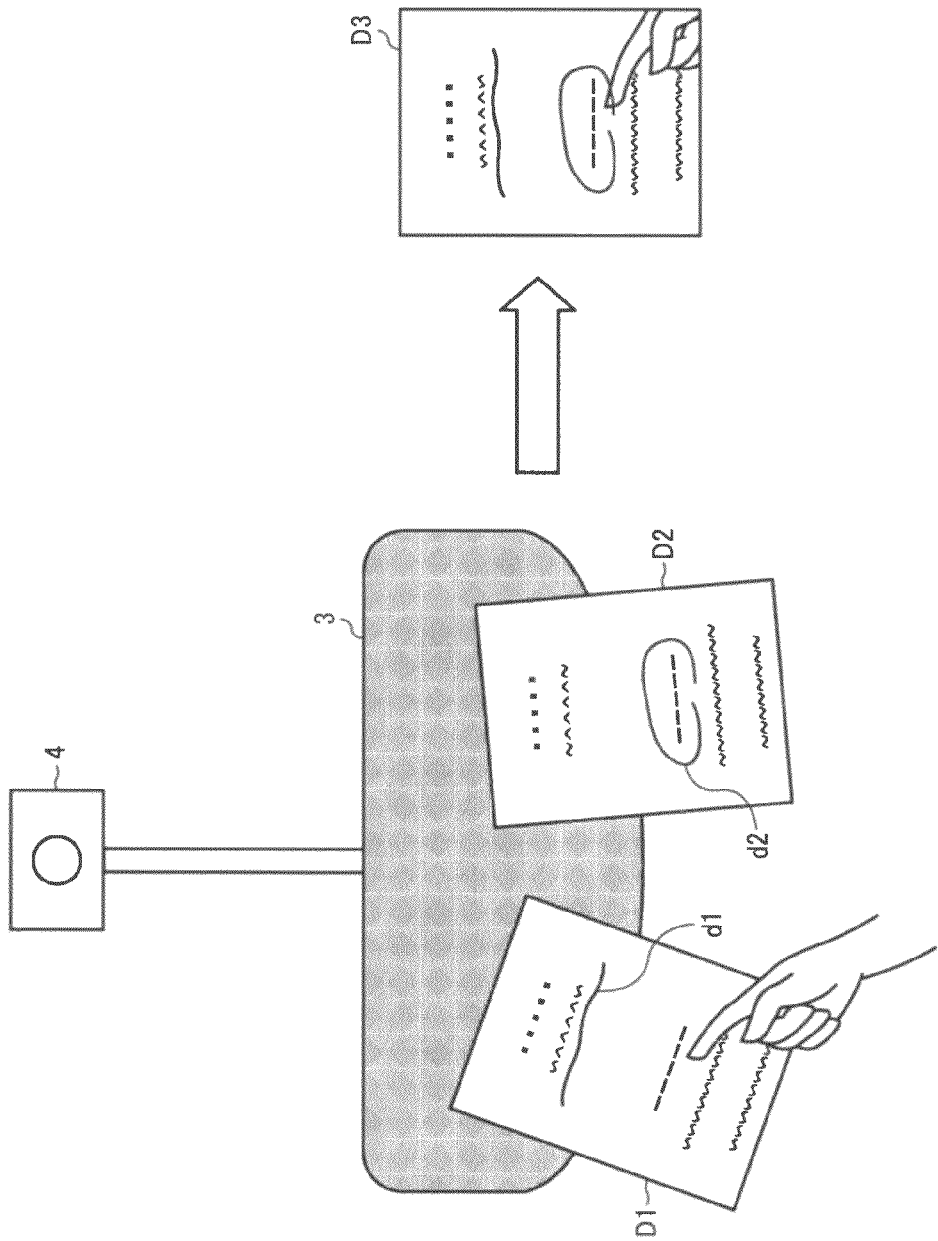
FIG. 7 is a schematic diagram illustrating various compositions of document images according to an illustrative embodiment of the present invention.

With reference to FIG. 7, a description is now provided of an example of combining a difference image with a document image. FIG. 7 is a schematic diagram for explaining composition of document images.

In FIG. 7, a document D1 and a document D2 placed on the document table 3 include the same content. Each user writes on the documents D1 and D2. The writing on the document D1 is indicated as d1 and the writing on the document D2 is indicated as d2. Furthermore, FIG. 7 shows a hand of the user pointing at a portion of the document D1.

In such a case, the original image storage unit 24 stores the image showing the content of the document D1 or the document D2 without the writing d1 and d2 as an original image. The difference extraction unit 25 extracts an image showing the writing d1 and the hand of the user as a difference image of the document D1. Similarly, the difference extraction unit 25 extracts an image showing the writing d2 as a difference image of the document D2. The image composition unit 26 combines the difference images with the original image to generate a composite document image D3.

The image composition unit 26 enables the display device 6 to show the composite document image D3 through the video output module 15. For example, the image composition unit 26 may generate one window for each composite document image in which different writing is added on a plurality of documents having the same content, and enables the display device 6 to show the window.

Furthermore, the image composition unit 26 may enable the hard disk 13 to store the composite document image in accordance with operation of the input device 14.

Figure 8:
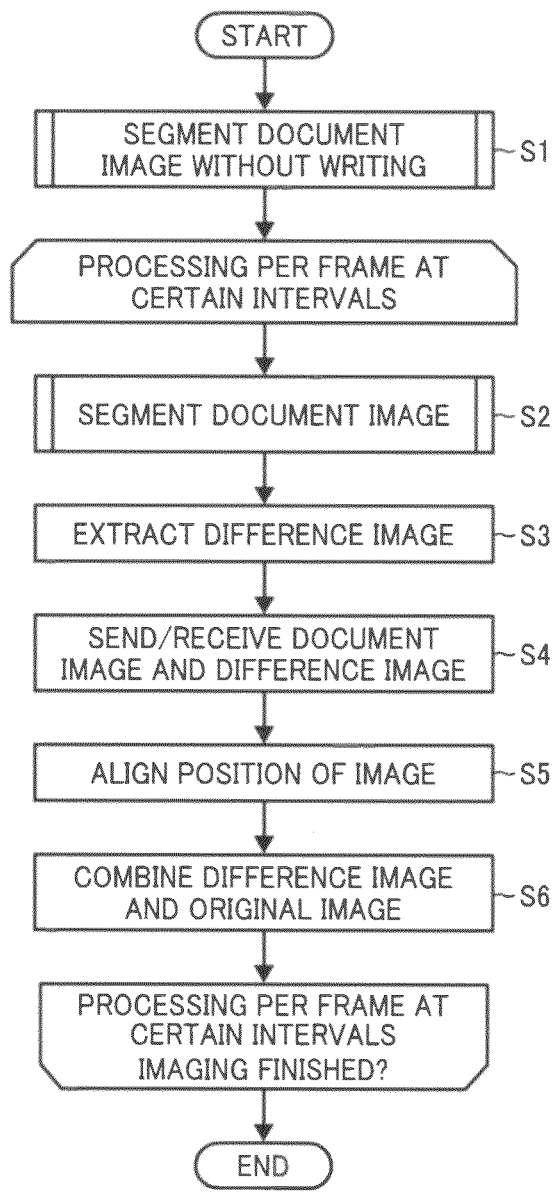
FIG. 8 is a flowchart showing steps in an exemplary procedure performed by the image extraction device according to the illustrative embodiment of the present invention.

With reference to FIG. 8, a description is now provided of operation of the image extraction device 5 of the shared document camera system 1. FIG. 8 is a flowchart showing steps in an exemplary procedure performed by the image extraction device 5 according to the illustrative embodiment of the present invention.

The image extraction devices 5a and 5b initialize the following operation while one side of a document having the same content as another document without writing of a user placed on the document table 3a is placed on the document table 3b.

Each of the imaging devices 4 shoots the entire documents on the document tables 3a and 3b and continuously outputs data of shot images.

As shown in FIG. 8, at step S1, based on the image received from the imaging device 4, the image extraction unit 22 segments the document image from the frame showing the document without additional writing. Then, the original image storage unit 24 stores the document image extracted by the image extraction unit 22 as an original image in the hard disk 13.

Subsequently, the following steps S2 through S6 are repeated at certain intervals for each frame of the image received from the imaging device 4.

First, at step S2, the document image is extracted from the relevant frame by the image extraction unit 22.

At step S3, the difference image between the extracted document image at step S2 and the original image stored in the hard disk 13 is extracted by the difference extraction unit 25.

Next, at step S4, the extracted document image at step S2 and the difference image extracted at step S3 are transmitted and received between the image extraction devices 5 by the image transmitter/receiver 23.

At step S5, based on the extracted document image at step S2 and the document image received at step S4, the image composition unit 26 aligns the position of the images.

At step S6, the image composition unit 26 combines the difference image extracted at step S3 and the difference image received at step S4 with the original image stored in the hard disk 13, thereby generating a single document image.

The image extraction device 5 displays the composite document image described above on the display device 6 and continues the operation until the imaging device 4 completes input of images.

Figure 9:
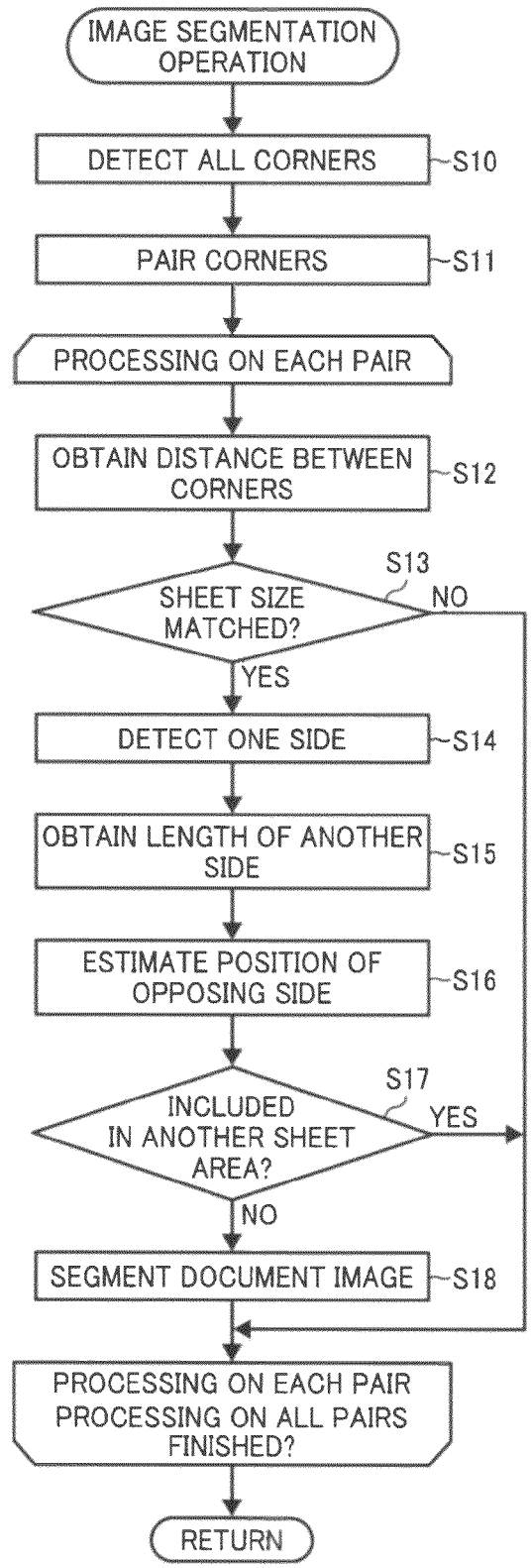
FIG. 9 is a flowchart showing steps in an image extraction operation according to the illustrative embodiment.

With reference to FIG. 9, a description is now provided of the image extraction operation executed at steps S1 and S2. FIG. 9 is a flowchart showing an exemplary procedure of the image extraction operation according to the illustrative embodiment.

As shown in FIG. 9, the side detection unit 20 detects all the corners in the respective frame. If there is a folded corner among the detected corners, the corner before the corner is folded is estimated at step S10.

Subsequently, at step S11, the side detection unit 20 pairs the detected corner and the estimated corner that is opposite the detected corner.

The processing at steps S12 through S18 is executed on the corners paired at S11.

At step S12, the side detection unit 20 calculates the distance between the paired corners. If the information including sizes of sheet having the horizontal width equivalent of the calculated distance between the paired corners is not stored in the hard disk 13 (NO, S13), this means that the paired corners do not represent both ends of one side of the document, and the processing at S12 and the subsequent processing are performed on the subsequent pair of corners.

By contrast, if the information including sizes of sheet having the horizontal width equivalent of the calculated distance between the paired corners is stored in the hard disk 13 (YES, S13), this means that the pair of corners represents both ends of one side, and the side detection unit 20 detects the paired corners as the side of the document at S14.

Next, at step S15, the vertical length of the respective sheet is obtained from the hard disk 13 by the opposing side estimator 21. Then, at step S16, the opposing side estimator 21 estimates the position of the opposing side based on the detected side detected at step S14 and the vertical length obtained at step S15.

Subsequently, at step S17, the image extraction unit 22 determines whether or not the sheet area demarcated by the side detected at step S14 and its opposing position estimated at step S16 is included in another sheet area demarcated by another pair.

If it is determined that the sheet area is included in another sheet area, the sheet area is considered as not representing the document, and the processing at step S12 and the subsequent processing are executed on the subsequent pair of corners.

By contrast, if it is determined that the sheet area is not included in another sheet area, the image extraction unit 22 segments the sheet area as the document image, corrects rotation, and stores the document image in the hard disk 13 at step S18.

When the processing described above is performed on all of the paired corners paired at step S11, the image extraction operation is finished.

According to the illustrative embodiment, even when the entire document is not placed on the document table, the image extraction device can still segment an image showing an entire document by detecting one side of the document placed on the document table to estimate its opposing side.

According to the illustrative embodiment, when the extracted document image and the document image received from another image extraction unit show the same content, in accordance with changes in the document images, the image extraction device combines the original image with the difference image between the extracted document image after change and the original image, and the difference image between the document image received from another image extraction device after change and the original image, thereby generating one document image.

With this configuration, when multiple image extraction devices segment document images showing a plurality of documents having the same content, additional writing written on each document can be combined with a single document image, thereby enabling the users of different image extraction devices to share the document image.

According to the illustrative embodiment, an example is provided of each of the image extraction units 5 that segment the document image representing one document. Alternatively, each of the image extraction units 5 may segment multiple document images representing a plurality of documents.

The foregoing description pertains to an example of each of the image extraction devices 5 that segment document images showing the same content and combining the difference images with the original image. Alternatively, each image extraction devices 5 may segment document images showing a different content and transmit the extracted document images between the image extraction devices 5.

Further, the image extraction device 5 may operate standalone.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An image extraction device for extracting an image showing a document from an image of the document shot by an imaging device, comprising:
   a document table on which a document is placed;
   the imaging device to capture the image of the document, including a part of the document which extends beyond the document table;
   a side detection unit to detect a side of the document on the document table by distinguishing the document from the document table;
   an opposing side estimator to estimate a position of a side opposite the side detected by the side detection unit; and
   an image extraction unit to extract the image of the document from the shot image of the document based on the side detected by the side detection unit and the opposite side estimated by the opposing side estimator.

2. The image extraction device according to claim 1, wherein the side detection unit detects and extracts a corner of the document including a folded corner on the document table based on the shot image, estimates a position of the corner prior to folding based on the extracted corner, and detects the side of the document based on the detected corner and the estimated corner.

3. The image extraction device according to claim 1, wherein
   at least two corners and an edge connecting the two corners of the document are free from contact with the document table, and
   the side detection unit detects a corner of the document, the corner being in contact with the document table.

4. The image extraction device according to claim 1, wherein the side detection unit
   detects two corners of the document,
   determines a distance between the detected corners, and
   references pre-stored information on sheet sizes to find a sheet size corresponding to the determined distances between the detected corners.

5. The image extraction device according to claim 1, wherein the opposing side estimator estimates the position of the side opposite to the side detected by the side detection unit by
   obtaining a pre-stored sheet length associated with a sheet width corresponding to the side of the document detected by the side detection unit, and
   estimating the position of the side opposite to the side detected by the side detection unit to be farther from the imaging device than the side detected by the side detection unit in a direction perpendicular to the side detected by the side detection unit by the obtained sheet length.

6. The image extraction device according to claim 1, wherein the side opposite to the side detected by the side detection unit is not in contact with the document table.

7. An image extraction device for extracting an image showing a document from an image of the document shot by an imaging device, comprising:
   a document table on which a document is placed;
   the imaging device to capture the image of the document, including a part of the document which extends beyond the document table;
   a side detection unit to detect a side of the document on the document table by distinguishing the document from the document table;
   an opposing side estimator to estimate a position of a side of the document opposite the side detected by the side detection unit;
   an image extraction unit to extract the document image from the shot image based on the side detected by the side detection unit and its opposite side estimated by the opposing side estimator;
   an original image storage unit to store a document image as an original image when a plurality of document images show the same content; and
   an image composition unit to form a single document image by combining the original image with one or more difference images showing differences between the plurality of document images and the original image after a change is made to the plurality of document images.

8. The image extraction device according to claim 7, wherein the side detection unit detects and extracts a corner of the document including a folded corner on the document table based on the shot image, estimates a position of the corner prior to folding, and detects the side of the document based on the detected corner and the estimated corner.

9. The image extraction device according to claim 7, further comprising an image transmitter/receiver to transmit to and receive from another image extraction device the document image and the one or more difference images,
   wherein for a document image extracted by the image extraction unit and a document image received by the image transmitter/receiver showing the same content, the original image storage unit stores the document image showing the content as the original image, and for a changed document image the image composition unit forms a single document image by combining the original image with the one or more difference images showing differences between the extracted image extracted by the image extraction unit and the original image after the change and the one or more difference images showing differences between the document image received by the image transmitter/receiver and the original image after the change.

10. The image extraction device according to claim 7, wherein
    at least two corners and an edge connecting the two corners of the document are free from contact with the document table, and
    the side detection unit detects a corner of the document, the corner being in contact with the document table.

11. The image extraction device according to claim 7, wherein the side detection unit
    detects two corners of the document,
    determines a distance between the detected corners, and
    references pre-stored information on sheet sizes to find a sheet size corresponding to the determined distances between the detected corners.

12. The image extraction device according to claim 7, wherein the opposing side estimator estimates the position of the side opposite to the side detected by the side detection unit by obtaining a pre-stored sheet length associated with a sheet width corresponding to the side of the document detected by the side detection unit, and estimating the position of the side opposite to the side detected by the side detection unit to be farther from the imaging device than the side detected by the side detection unit in a direction perpendicular to the side detected by the side detection unit by the obtained sheet length.

13. The image extraction device according to claim 7, wherein the side opposite to the side detected by the side detection unit is not in contact with the document table.

14. An image extraction method for extracting an image showing a document from an image of the document shot by an imaging device, comprising:

capturing, using the imaging device, an image of the document on a document table, including a part of the document which extends beyond the document table;

detecting a side of the document on the document table by distinguishing the document from the document table;

estimating a position of a side opposite the side detected by the detecting; and extracting the document image from the shot image of the document based on the side detected by the detecting and the opposite side estimated by the estimating.

15. The image extraction method according to claim 14, wherein the detecting includes detecting and extracting a corner of the document including a folded corner based on the shot image, estimates a position of the corner prior to folding, and detects the side of the document based on the detected corner and the estimated corner.

16. The image extraction method according to claim 14, wherein at least two corners and an edge connecting the two corners of the document are free from contact with the document table, and the detecting includes detecting a corner of the document, the corner being in contact with the document table.

17. The image extraction method according to claim 14, wherein detecting the side of the document includes detecting two corners of the document, determining a distance between the detected corners, and referencing pre-stored information on sheet sizes to find a sheet size corresponding to the determined distances between the detected corners.

18. The image extraction method according to claim 14, wherein the estimating the position of the side opposite to the side detected by the detecting includes obtaining a pre-stored sheet length associated with a sheet width corresponding to the side of the document detected by the detecting, and estimating the position to be farther from the imaging device than the side detected by the detecting in a direction perpendicular to the side detected by the detecting by the obtained sheet length.

19. The image extraction method according to claim 14, wherein the side opposite to the side detected by the detecting is not in contact with the document table.

* * * * *